(12) United States Patent
Taillant et al.

(10) Patent No.: US 12,305,579 B2
(45) Date of Patent: May 20, 2025

(54) AIRCRAFT TURBOMACHINE COMPRISING AN ELECTRIC MACHINE

(71) Applicant: SAFRAN AIRCRAFT ENGINES, Paris (FR)

(72) Inventors: Jean-Claude Christian Taillant, Moissy-Cramayel (FR); Emmanuel Fabrice Marie Baret, Moissy-Cramayel (FR); Julien Fabien Patrick Becoulet, Moissy-Cramayel (FR); Pierre-Alain Jean Philippe Reigner, Moissy-Cramayel (FR); Tewfik Boudebiza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/715,843

(22) PCT Filed: Dec. 12, 2022

(86) PCT No.: PCT/FR2022/052309
§ 371 (c)(1),
(2) Date: Jun. 3, 2024

(87) PCT Pub. No.: WO2023/111433
PCT Pub. Date: Jun. 22, 2023

(65) Prior Publication Data
US 2025/0052203 A1     Feb. 13, 2025

(30) Foreign Application Priority Data
Dec. 13, 2021   (FR) ...................................... 2113361

(51) Int. Cl.
*F02C 7/36*     (2006.01)
*F01D 15/10*   (2006.01)
(Continued)

(52) U.S. Cl.
CPC ................ *F02C 7/36* (2013.01); *F01D 15/10* (2013.01); *F02C 7/32* (2013.01); *H02K 7/1823* (2013.01);
(Continued)

(58) Field of Classification Search
CPC ........... F02C 7/36; F02C 7/32; H02K 7/1823; H02K 1/17; H02K 1/27
See application file for complete search history.

(56) References Cited

U.S. PATENT DOCUMENTS 8,939,399 B2 *   1/2015   Kouros .................. B64D 31/18
                                                          244/17.11
9,190,892 B2 *  11/2015   Anthony .............. H02K 49/102
(Continued)

FOREIGN PATENT DOCUMENTS

EP     3467331 A1    4/2019
FR     2106935 A5    5/1972

OTHER PUBLICATIONS

International Search Report for PCT/FR2022/052309 dated Mar. 20, 2023.

*Primary Examiner* — J. Todd Newton
(74) *Attorney, Agent, or Firm* — McDonald Hopkins LLC

(57) ABSTRACT

A turbomachine for an aircraft comprising a stator, a turbine shaft and an electric machine arranged to the rear of the turbine shaft, and comprising an electric machine stator and an electric machine rotor, a rotationally fixed coupling carriage capable of moving in axial translation relative to the electric machine rotor between coupled and uncoupled positions, coupling members which are designed to engage with one another after the coupling carriage has moved from the uncoupled position to the coupled position and to transmit a torque from the turbine shaft to the electric machine rotor when they are engaged, and an elastic return member
(Continued)

designed to elastically return the coupling carriage in axial translation to the coupled position.

7 Claims, 3 Drawing Sheets

(51) Int. Cl.
    *F02C 7/32*     (2006.01)
    *H02K 1/17*     (2006.01)
    *H02K 1/27*     (2022.01)
    *H02K 7/18*     (2006.01)

(52) U.S. Cl.
    CPC ............ *F05D 2260/98* (2013.01); *H02K 1/17* (2013.01); *H02K 1/27* (2013.01)

(56) References Cited

U.S. PATENT DOCUMENTS

| | | | |
|---|---|---|---|
| 11,002,146 B1* | 5/2021 | O'Neill | B64D 35/023 |
| 2004/0055850 A1* | 3/2004 | Howard | F16D 11/10 |
| | | | 192/114 R |
| 2010/0156113 A1* | 6/2010 | Lemmers, Jr. | F02C 7/32 |
| | | | 192/84.1 |
| 2010/0283341 A1* | 11/2010 | Grosskopf | F16D 23/12 |
| | | | 310/78 |
| 2013/0014513 A1* | 1/2013 | Barnett | F02C 7/32 |
| | | | 60/802 |
| 2014/0010652 A1* | 1/2014 | Suntharalingam | B64D 35/023 |
| | | | 475/5 |
| 2015/0377142 A1* | 12/2015 | Sheridan | F02C 7/275 |
| | | | 60/778 |
| 2017/0016489 A1* | 1/2017 | Grosskopf | F16D 23/12 |
| 2018/0050806 A1* | 2/2018 | Kupiszewski | F02C 7/24 |
| 2018/0131250 A1* | 5/2018 | Jewell | H02K 7/1823 |
| 2019/0101162 A1* | 4/2019 | Hochstetler | F16D 1/04 |
| 2020/0063606 A1* | 2/2020 | Miller | F01D 25/28 |
| 2020/0290744 A1* | 9/2020 | Spierling | F01D 15/10 |
| 2021/0119511 A1* | 4/2021 | Bloor | F16D 3/06 |
| 2021/0172382 A1 | 6/2021 | Bruce | |
| 2022/0045587 A1* | 2/2022 | Zatorski | F01D 15/10 |
| 2022/0069688 A1* | 3/2022 | Zatorski | H02K 21/025 |
| 2023/0291278 A1* | 9/2023 | Schmidt | H02P 9/008 |

* cited by examiner ly in the axial direction with the electric machine
rotor, a coupling part carrying the other of the coupling
members and a connecting part connecting the carriage
part to the coupling part and comprising a first portion
that extends axially in the extension of the coupling
part towards the carriage part and that forms a tapered
flange;

the turbomachine comprises a lubricated enclosure
wherein are housed the bearings supporting the electric
machine rotor and first splines arranged in correspondence in the coupling carriage and in the electric
machine rotor to drive in rotation the coupling carriage
by the electric machine rotor and/or vice versa and to
guide in axial translation the coupling carriage relative
to the electric machine rotor, and a lubrication circuit
comprising an injector designed to inject oil into the
lubricated enclosure;

the turbomachine comprises locking members, one carried by the electric machine rotor, the other carried by
the coupling carriage, the locking members being
designed to engage with one another after the coupling
carriage has moved in translation relative to the electric
machine rotor from the coupled position to the
uncoupled position and to lock the translational movement of the coupling carriage relative to the electric
machine rotor from the uncoupled position to the
coupled position, when the coupling carriage occupies
the uncoupled position;

the movable part of the actuator is designed to move in
translation relative to the fixed part from the second
engaged position to a second disengaged position
wherein the movable part and the coupling carriage are
free to move relative to one another, when the coupling
carriage is locked in uncoupled position by the locking
members.

AIRCRAFT TURBOMACHINE COMPRISING AN ELECTRIC MACHINE

CROSS-REFERENCE TO RELATED APPLICATIONS

This is the National Stage application of PCT international application PCT/FR2022/052309, filed on Dec. 12, 2022, which claims the priority of French Patent Application No. 2113361, filed Dec. 13, 2021, both of which are incorporated herein by reference in their entireties.

TECHNICAL FIELD

The invention relates to an aircraft turbomachine comprising an electric machine.

PRIOR ART

It is known to equip aircraft turbomachines with an electric generator. This electric generator takes mechanical power to a high-pressure body of the turbomachine, by means of an Accessory Gear Box (AGB), in order to transmit it to accessories, such as an oil pump or a fuel pump.

In order to compensate for this electric generator, the application filed under the number FR2106935 in the name of the Applicant provides for example to install an electric machine at a rear end of the turbomachine. This electric machine is provided to take and/or transmit the mechanical power, via its rotor, at a rear end of a turbine shaft of the turbomachine, particularly at a rear end of a low-pressure shaft in the case of a twin-spool turbomachine.

However, such an installation poses a few difficulties for its implementation. Concerning the coupling and the transmission of forces between the turbine shaft and the electric machine, there may be an offset between the turbine shaft and the rotor of the electric machine. The turbine shaft may also move during operation, particularly due to its dynamics or also its thermal expansion. From a safety point of view, it may further be necessary to uncouple the rotor of the electric machine from the turbine shaft that drives it, in the event of a short circuit, particularly if the electric machine has permanent magnets.

DISCLOSURE OF THE INVENTION

The aim of the present invention is to overcome these various difficulties.

To this end, an object of the invention is an aircraft turbomachine extending along a longitudinal axis and comprising the features of claim 1.

According to alternative embodiments that may be taken together or separately:

the coupling members are dogs;

the rear end of the turbine shaft carries one of the coupling members by means of an annular support comprising, successively in the axial direction, a first part mounted rotationally fixed with the turbine shaft, a second part carrying said coupling member and a third flexible part connecting the first part to the second part and being capable of allowing a movement of the first part relative to the second part in the axial and radial directions;

the coupling carriage comprises a carriage part by means of which the coupling carriage is mounted rotationally fixed about the electric machine axis and free in trans-

BRIEF DESCRIPTION OF THE DRAWINGS

Other aspects, aims, advantages and features of the invention will become more apparent upon reading the following detailed description of preferred embodiments thereof, given as a non-limiting example, and made with reference to the appended drawings, wherein.

DETAILED DESCRIPTION

Figure 1:
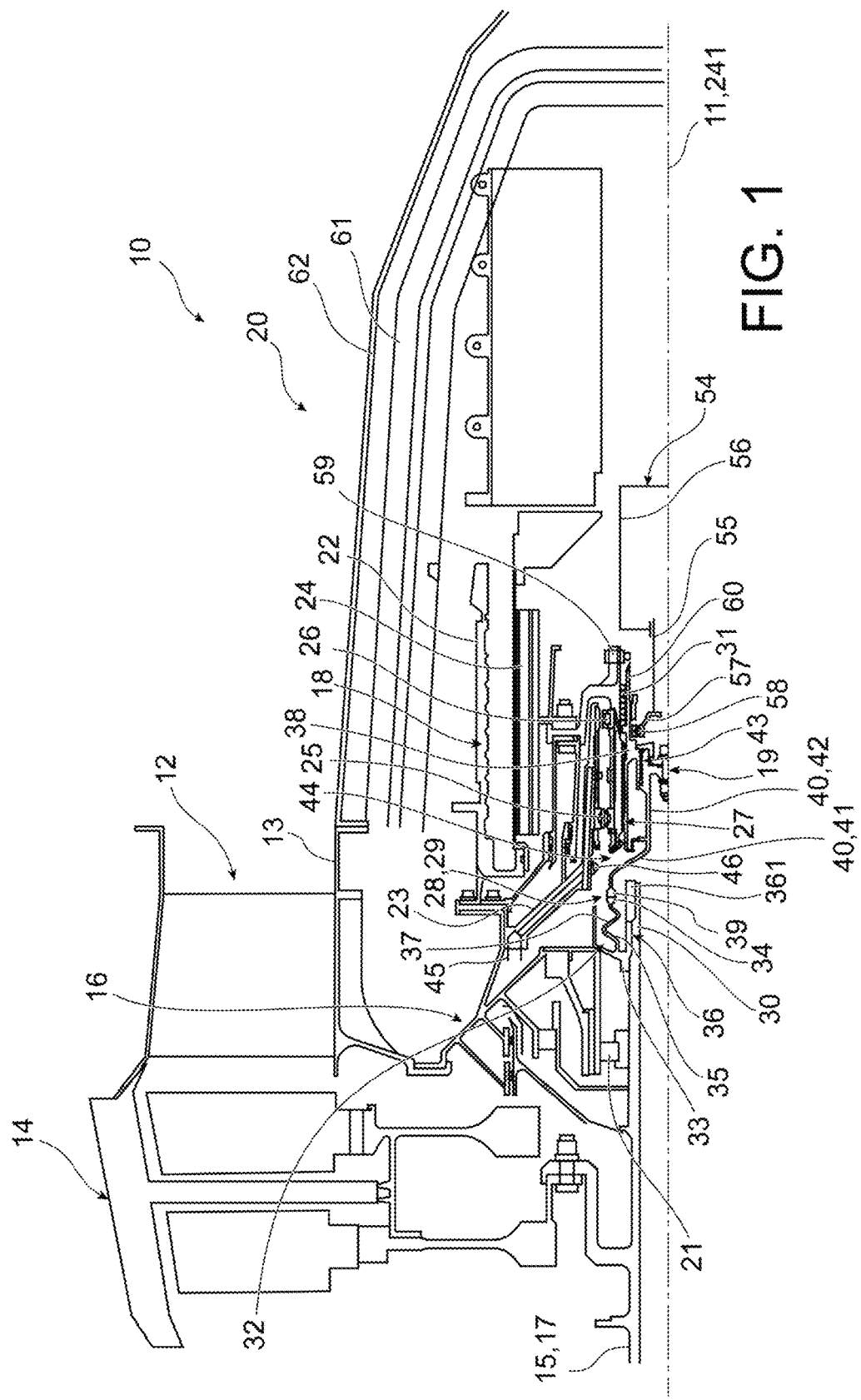
FIG. 1 is a partial longitudinal sectional view of an aircraft turbomachine according to one embodiment of the invention, a coupling carriage of the turbomachine occupying a coupled position.
Figure 2:
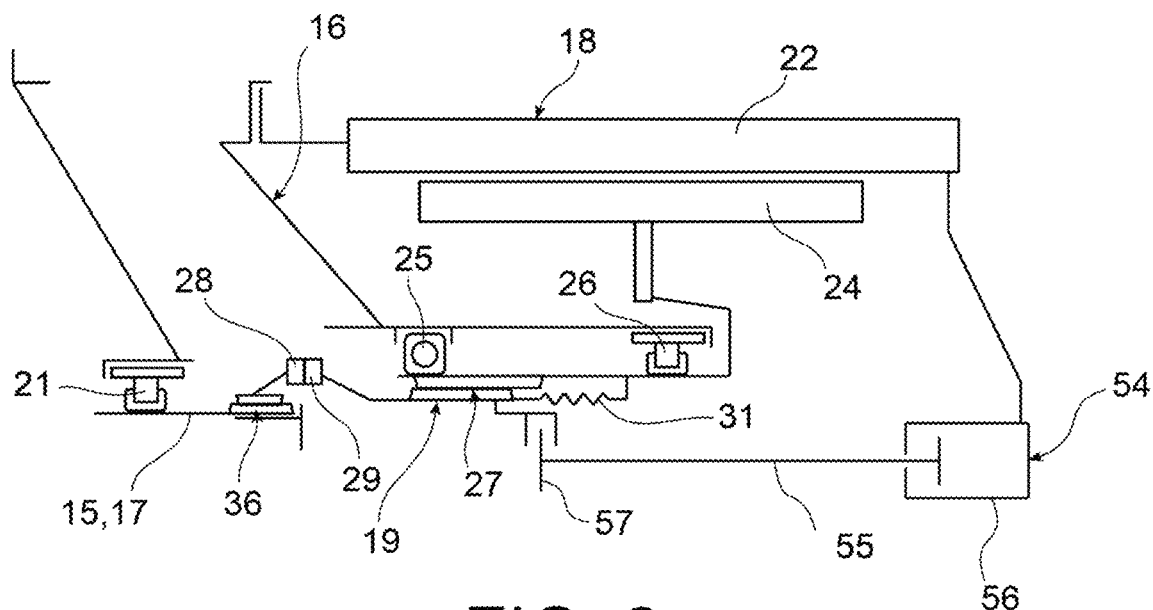
FIG. 2 is a schematic and partial longitudinal sectional view of the turbomachine illustrated in FIG. 1, the coupling carriage occupying the coupled position.

FIGS. 1 to 4 show an aircraft turbomachine 10 according to one embodiment of the invention. The turbomachine 10 is for example a turbojet, particularly a twin-spool turbojet. This turbojet may be a single-flow jet engine or a turbofan.

In alternative embodiments (not shown), the turbomachine 10 is a turboprop or a turbomachine of the type known as "open rotor".

Preliminarily, it is defined an axial direction, a radial direction that is orthogonal to the axial direction and a circumferential direction that is orthogonal to the axial and radial directions.

The turbomachine 10 extends along a longitudinal axis 11 of axial direction and comprises, from upstream to downstream in the direction of flow of the gases, compressors (not shown), a combustion chamber (not shown), turbines and an exhaust pipe 12 comprising a turbine rear frame (TRF) 13. When the turbomachine 10 is a turbofan, it comprises, on the one hand, a low-pressure compressor and a low-pressure turbine 14 forming a low-pressure body and connected to one another by a low-pressure shaft 15 centred along the longitudinal axis 11, and on the other hand, a high-pressure compressor and a high-pressure turbine (not shown) forming a high-pressure body and connected to one another by a high-pressure shaft (not shown) centred along the longitudinal axis 11 and arranged about the low-pressure shaft 15.

The turbomachine 10 further comprises a fixed stator 16, a turbine shaft 17, an electric machine 18 and a coupling carriage 19.

The stator 16 is for example formed by the turbine rear frame 13.

The turbine shaft 17 extends along the longitudinal axis 11 up to a rear end 20 or downstream of the turbomachine 10. The turbine shaft 17 is capable of rotating about the longitudinal axis 11 relative to the stator 16 of the turbomachine 10. For this purpose, the turbine shaft 17 is particularly guided in rotation by a rear or downstream bearing 21 or supported by the stator 16 of the turbomachine 10 surrounding the turbine shaft 17. The turbine shaft 17 is for example formed by the low-pressure shaft 15.

The electric machine 18 is arranged at the rear or downstream of the turbine shaft 17. It comprises an electric machine stator 22 attached to the stator 16 of the turbomachine 10, particularly via a casing 23 of the electric machine 18, and an electric machine rotor 24 coaxial with the electric machine stator 22 about an electric machine axis 241 of axial direction. The electric machine rotor 24 may be surrounded by or surround the electric machine stator 22. The electric machine rotor 24 is further capable of rotating relative to the electric machine stator 22 about the electric machine axis 241. For this purpose, the electric machine rotor 24 is particularly guided in rotation by bearings 25, 26, for example a front or upstream bearing 25 and a rear or downstream bearing 26, supported by the stator 16 of the turbomachine 10, particularly via the casing 23 of the electric machine 18. situlf it is provided that the longitudinal axis 11 and the electric machine axis 241 are combined, there may however be a slight offset between these two axes, which may be the result of the constraints of manufacturing the turbomachine 10 or of a movement of the turbine shaft 17 during operation. The electric machine rotor 24 is for example mounted fixed in axial translation with the stator 16 of the turbomachine 10, particularly via one of the bearings 25, 26 mounted on the casing 23 of the electric machine 18 and locked in translation relative to the latter. The electric machine 18 may produce electricity and therefore operate as a generator, or be reversible and operate both as a generator and as a starter. The electric machine 18 has for example permanent magnets.

Figure 3:
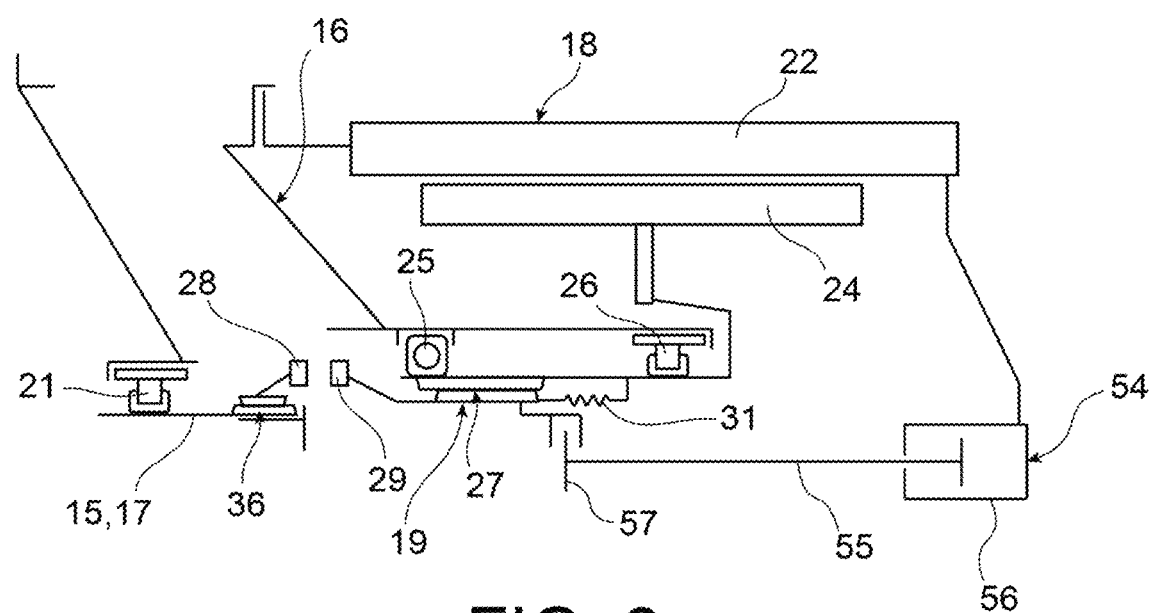
FIG. 3 is a schematic and partial longitudinal sectional view of the turbomachine illustrated in FIGS. 1 and 2, the coupling carriage occupying an uncoupled position.
Figure 4:
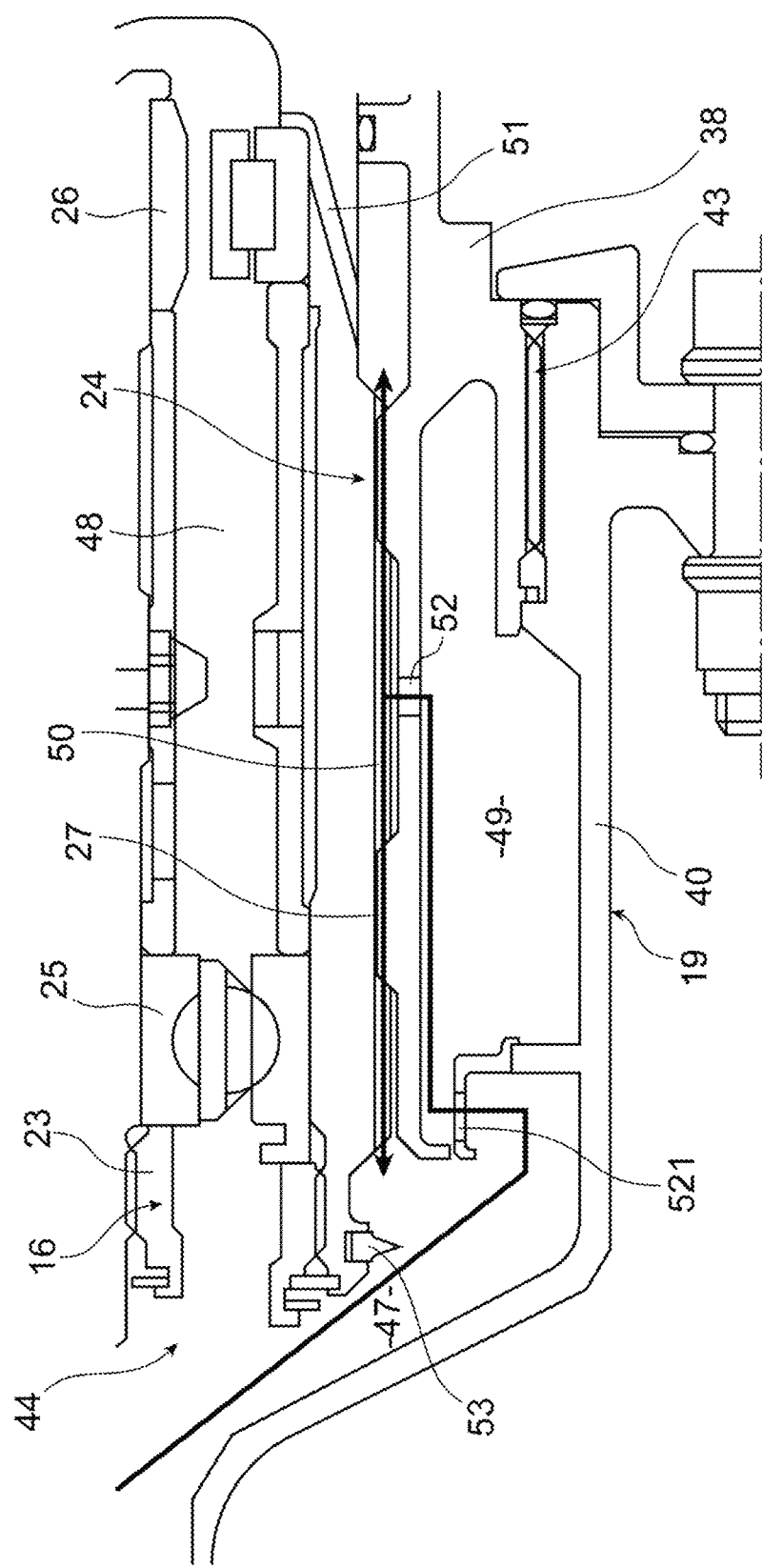
FIG. 4 is a partial longitudinal sectional view of a lubricated enclosure of the turbomachine illustrated in FIGS. 1 to 3, the coupling carriage occupying an intermediate position between the coupled position and the uncoupled position.

The coupling carriage 19 is mounted rotationally fixed with the electric machine rotor 24 about the electric machine axis 241 and is capable of moving in translation relative to the electric machine rotor 24 in the axial direction between a coupled position (FIGS. 1 and 2) and an uncoupled position (FIG. 3). In the uncoupled position, the coupling carriage 19 is for example located further at the rear or downstream than in coupled position. For this purpose, first splines 27 are for example arranged in correspondence in the coupling carriage 19 and in the electric machine rotor 24 and are engaged to drive in rotation the coupling carriage 19 by the electric machine rotor 24 and/or vice versa and to guide in axial translation the coupling carriage 19 relative to the electric machine rotor 24.

The turbomachine 10 also comprises coupling members 28, 29, one 28 carried by a rear or downstream end 30 of the turbine shaft 17, the other 29 carried by the coupling carriage 19. The coupling members 28, 29 are designed to engage with one another after the coupling carriage 19 has moved from the uncoupled position to the coupled position. The coupling members 28, 29 thus engage with one another when the coupling carriage 19 moving from the uncoupled position to the coupled position, reaches the coupled position. The coupling members 28, 29 are further designed to transmit a mechanical power or also a torque from the turbine shaft 17 to the electric machine rotor 24 and/or from the electric machine rotor 24 to the turbine shaft 17, when the coupling members 28, 29 are engaged with one another, the coupling carriage 19 occupying the coupled position. In other words, when the coupling carriage 19 occupies the coupled position, one of the turbine shaft 17 and electric machine rotor 24 drives the other turbine shaft 17 and electric machine rotor 24 about the longitudinal axis 11 or the electric machine axis 241.

According to the invention, the turbomachine 10 further comprises an elastic return member 31, such as a spring, mounted between the coupling carriage 19 and the electric machine rotor 24 and designed to elastically return the coupling carriage 19 in translation in the axial direction to the coupled position.

In this way, in the event of axial movement of the turbine shaft 17 relative to the stator 16, the coupling carriage 19 is able to adapt its axial position to maintain the coupling of the turbine shaft 17 and of the electric machine rotor 24 via the coupling members 28, 29. In other terms, the elastic return member 31 forces the engagement of the coupling members 28, 29. This makes it possible to prevent an unexpected uncoupling of the turbine shaft 17 and of the electric machine rotor 24, which would have the consequence of stopping the transmission of mechanical power from one to the other of the turbine shaft 17 and electric machine rotor 24 and therefore of stopping the operation of the electric machine 18. This also makes it possible to limit the axial forces that transit between the turbine shaft 17 and the electric machine rotor 24 via the coupling carriage 19. Such an axial movement of the turbine shaft 17 intervenes for example during operation when the stator 16 and the turbine shaft 17 extend in the axial direction and when the stator 16 extends more than the turbine shaft 17, therefore creating an axial offset between the stator 16 and the turbine shaft 17 (straight turning phenomenon). The coupling members 28, 29 are for example dogs.

The rear end 30 of the turbine shaft 17 carries for example one 28 of the coupling members 28, 29 by means of an annular support 32 comprising, successively in the axial direction, a first part 33 surrounding the rear end 30 of the turbine shaft 17 and mounted rotationally fixed with the turbine shaft 17 about the longitudinal axis 11, a second part 34 carrying said coupling member 28 and a third part 35 connecting the first part 33 to the second part 34. Second splines 36 are for example arranged in correspondence in the first part 33 of the support 32 and in the rear end 30 of the turbine shaft 17 and are engaged to drive in rotation the support 32 by the rear end 30 of the turbine shaft 17 and/or vice versa. The first, second and third parts 33, 34, 35 of the support 32 are for example formed in one piece. The support 32 is for example locked in axial translation rearwards or downstream relative to the turbine shaft 17, by means of a nut 361 mounted on the rear end 30 of the turbine shaft 17, at the rear or downstream of said support 32.

The third part 35 of the support 32 is for example flexible and capable of allowing a movement of the first part 33 relative to the second part 34 of the support 32 in the axial and radial directions. This makes it possible to give a flexibility in movement in the axial and radial directions to the second part 34 of the support 32, and therefore to said coupling member 28, relative to the turbine shaft 17, and therefore to the turbomachine 10 in order to adapt to a possible offset between the turbine shaft 17 and the electric machine rotor 24. For this purpose, the third part 35 of the support 32 comprises for example one or more bends 37 or waves in the axial direction so as to give a flexibility in movement in the axial and radial directions to the second part 34 of the support 32, and therefore to said coupling member 28, relative to the turbine shaft 17. The third part 35 of the support 32 may additionally or alternatively be made thinner.

The coupling carriage 19 comprises for example a carriage part 38 by means of which the coupling carriage 19 is mounted rotationally fixed about the electric machine axis 241 and free in translation in the axial direction with the electric machine rotor 24, particularly via the first splines 27, a coupling part 39 carrying the other 29 of the coupling members 28, 29 and a connecting part 40 connecting the carriage part 38 to the coupling part 39. The elastic return member 31 may further be mounted between the carriage part 38 of the coupling carriage 19 and the electric machine rotor 24.

The connecting part 40 of the coupling carriage 19 may further comprise a first portion 41 extending axially in the extension of the coupling part 39 towards the carriage part 38 and forming a wall or tapered flange, that is particularly thin. The first portion 41 converges for example rearwards or downstream from the coupling part 39. The first portion 41 of the connecting part 40 not only makes it possible to axially move the carriage part 38 and the coupling part 39 apart, but also to move them radially apart so as to limit the transmission of parasitic radial forces via the coupling members 28, 29. Thus, this makes it possible for the turbomachine 10 to adapt to a possible offset between the turbine shaft 17 and the electric machine rotor 24.

The connecting part 40 may also comprise a second portion 42 that extends axially in the extension of the first portion 41, radially opposite the carriage part 38, and that is mounted fixed with the carriage part 38. The coupling part 39 and the connecting part 40 are for example formed in one piece. Three splines 43, locked in axial translation relative to the coupling part 39 and to the connecting part 40, for example by washers (not referenced), may also be arranged in correspondence in the carriage part 38 and in the second portion 42 of the connecting part 40 and engaged for fixedly mounting the carriage part 38 and in the second portion 42 of the connecting part 40. The third splines 43 may be replaced with dogs or Curvic Couplings® locked in axial translation by appropriate means.

The turbomachine 10 further comprises a lubricated enclosure 44 (FIG. 4) wherein the bearings 25, 26 supporting the electric machine rotor 24 and the first splines 27 are housed and a lubrication circuit 45 comprising an injector 46 or nozzle designed to inject oil into the lubricated enclosure 44 in order to ensure the lubrication of the bearings 25, 26 and of the first splines 27. The injector 46 is for example carried by the casing 23 of the electric machine 18 and supplied with oil by a channel (not referenced) of the lubrication circuit 45 arranged in said casing 23.

The lubricated enclosure 44 comprises:
- a first annular space 47 receiving the injector 46,
- a second annular space 48 wherein the bearings 25, 26 supporting the electric machine rotor 24 are housed, the second annular space 48 being axially offset relative to the first annular space 47, for example rearwards or downstream, and communicating with the first annular space 47,
- a third annular space 49 surrounded by or surrounding the second annular space 48 and arranged within the coupling carriage 19, particularly between the second portion 42 of the connecting part 40 and the carriage part 38, the third annular space 49 communicating with the first annular space 47,
- a fourth annular space 50 wherein the first splines 27 are housed, the fourth annular space 50 being radially interposed between the second and third annular spaces 48, 49 and communicating, on the one hand, with the second annular space 48 via a first channel 51, and on the other hand, with the third annular space 49 via a second channel 52.

In this way, the oil injected by the injector 46 into the first annular space 47 flows by centrifugal effect successively through the third or second, the fourth and the second or third annular spaces 49, 50, 48 in order to ensure the lubrication of the bearings 25, 26 supporting the electric machine rotor 24 and first splines 27.

The injector 46 may further be designed to inject oil to that of the second and third annular spaces 48, 49 that is surrounded by the other of the second and third annular spaces 48, 49, particularly to a channel or an opening 521 by means of which that of the second and third annular spaces 48, 49 communicates with the first annular space 47, so as to favour the flow of oil by centrifugal effect through the second, third and fourth annular spaces 48, 49, 50.

The first channel 51 is for example inclined relative to the axial and radial directions. It may open out at the rear bearing 26 supporting the electric machine rotor 24. The second channel 52 is for example oriented radially, so as to favour the flow of oil by centrifugal effect between the third and fourth annular spaces 49, 50. The opening 521 is for example orientated radially, the oil flowing through the opening 521 from the first annular space 47 to the second or third annular space 48, 49, from the inside to the outside, so as to favour the flow of oil by centrifugal effect between the first annular space 47 and the second or third annular space 48, 49.

The electric machine rotor 24 may also carry a sealing member 53 (FIG. 4), such as a lip seal, arranged between the first and the fourth annular space 47, 50, for example at the front or upstream of the fourth annular space 50, when the coupling carriage 19 occupies the coupled position. The sealing member 53 makes it possible to form an oil bath at the fourth annular space 50 and therefore to ensure a sufficient oil level to lubricate the first splines 27.

The turbomachine 10 also comprises for example an actuator 54 designed to drive the coupling carriage 19, particularly the carriage part 38, in translation from the coupled position to the uncoupled position, as well as an electronic control unit (not shown) designed to control the actuator 54 to drive the coupling carriage 19 in translation from the coupled position to the uncoupled position. When it moves the coupling carriage 19 to the uncoupled position, the actuator 54 thus constrains the elastic return member 31, which tends on the contrary to move the coupling carriage 19 to the coupled position. The control unit is for example designed to receive instructions from a pilot of the aircraft, particularly by means of a user interface installed in the cockpit of the aircraft, and/or data representative of a failure of the electric machine 18 and/or of an electric circuit to which the electric machine 18 is connected. The actuator 54 thus makes it possible to uncouple the electric machine rotor 24 from the turbine shaft 17, particularly in the event of failure such as a short circuit or also during a disconnection test, which makes the implementation of the electric machine 18 safer.

For this purpose, the actuator 54 particularly comprises a movable part 55 and a fixed part 56 relative to which the movable part 55 moves in translation in the axial direction. The fixed part 56 is for example attached to the stator 16 of the turbomachine 10 or to the electric machine stator 22. The movable part 55 is designed to drive the coupling carriage 19, particularly the carriage part 38, in translation from the coupled position to the uncoupled position, when the movable part 55 itself moves in translation from a first engaged position to a second engaged position.

The movable part 55 is further designed to move in translation relative to the fixed part 56 from a first disengaged position wherein the movable part 55 and the coupling carriage 19 are free to move relative to one another, to the first engaged position, when the coupling carriage 19 occupies the coupled position. The movable part 55 moves from the first disengaged position to the first engaged position, then from the first engaged position to the second engaged position, in the same translational direction, for example rearwards or downstream. The movable part 55 may be rotationally fixed relative to the fixed part 56. In this way, when the coupling carriage 19 occupies the coupled position and when the control unit does not control the actuator 54 to drive the coupling carriage 19 to the uncoupled position, the movable part 55 of the actuator 54 does not constrain the elastic return member 31, which may thus elastically return the coupling carriage 19 to the coupled position and maintain the engagement of the coupling members 28, 29. On the other hand, when the control unit controls the actuator 54 to drive the coupling carriage 19 to the uncoupled position, the movable part 55 moves from the first disengaged position to the first engaged position where the movable part 55 engages with the coupling carriage 19, then from the first engaged position to the second engaged position, the movable part 55 then driving in translation the coupling carriage 19 to the uncoupled position.

For this purpose, the movable part 55 comprises for example an actuation flange 57 extending about the longitudinal axis 11 and designed to axially abut against the coupling carriage 19, particularly against the carriage part 38, after the movable part 55 has moved from the first disengaged position to the first engaged position, and to maintain the axial abutment against the coupling carriage 19, when the movable part 55 moves from the first engaged position to the second engaged position. The actuation flange 57 or the coupling carriage 19, particularly the carriage part 38, may further carry a ball bearing 58 or a roller bearing axially abutting against the coupling carriage 19 or against which the actuation flange 57 axially abuts.

Concerning the ball bearing 58, one of the radially external and internal cages is for example mounted fixed with one of the actuation flange 57 and coupling carriage 19, whereas the other of the radially external and internal cages, which axially abuts with the coupling carriage 19 or against which the actuation flange 57 abuts, is rotationally free relative to one of the external and internal cages. The ball bearing 58 may be lubricated with grease. Concerning the roller bearing, it is for example mounted rotationally free about one of the actuation flange 57 and coupling carriage 19. The ball bearing 58 or the roller bearing makes it possible to limit the contact forces between the movable part 55 of the actuator 54 and the coupling carriage 19, when the actuation flange 57 axially abuts against the coupling carriage 19 after the translation of the movable part 55 to the first engaged position and when the movable part 55 drives the coupling carriage 19 in translation from the coupled position to the uncoupled position.

The turbomachine 10 also comprises locking members 59, 60, one 59 carried by the electric machine rotor 24, the other 60 carried by the coupling carriage 19, particularly by the carriage part 38. The locking members 59, 60 are designed to engage with one another after the coupling carriage 19 has moved in translation relative to the electric machine rotor 24 from the coupled position to the uncoupled position and to lock the translational movement of the coupling carriage 19 relative to the electric machine rotor 24 from the uncoupled position to the coupled position, when the coupling carriage 19 occupies the uncoupled position. When they are engaged with one another, the locking members 59, 60 thus constrain the elastic return member 31, which tends on the contrary to move the coupling carriage 19 to the coupled position. In this way, when the control unit controls the actuator 54 to drive the coupling carriage 19 to the uncoupled position, the movable part 55 moves from the first disengaged position to the second engaged position by driving the coupling carriage 19 in translation to the uncoupled position where the locking members 59, 60 engage with one another to prevent the coupling carriage 19 from moving in the opposite direction to the coupled position under the effect of the elastic return member 31. The locking members 59, 60 thus make it possible to compensate for or, as will be explained hereinafter, replace the stress applied by the movable part 55 of the actuator 54 on the elastic return member 31 in uncoupled position of the coupling carriage 19.

The locking members 59, 60 comprise for example a hole and a locking pin capable of moving, particularly in radial translation, between a first position and a second position wherein the locking pin extends through the hole, when the coupling carriage 19 occupies the uncoupled position. For example, the locking pin is elastically returned to the second position by a spring, and a cam surface is designed to drive the locking pin by moving from the second position to the first position, when the coupling carriage 19 moves from the coupled position to the uncoupled position, and to release the locking pin at the hole, when the coupling carriage 19 reaches the uncoupled position. Alternatively, the movement of the locking pin between the first and second positions is by electrical control.

The movable part 55 may also be designed to move in translation relative to the fixed part 56 from the second engaged position to a second disengaged position wherein the movable part 55 and the coupling carriage 19 are free to move relative to one another, when the coupling carriage 19 is locked in uncoupled position by the locking members 59, 60. The movable part 55 moves from the second engaged position to the first disengaged position, in a translational direction opposite to that of the first engaged position to the second engaged position, for example forwards or upstream. In this way, the movable part 55 of the actuator 54 releases the coupling carriage 19 when it is locked in uncoupled position by the locking members 59, 60.

The turbomachine 10 may also comprise a heat shield wall 61 surrounding the electric machine 18. The heat shield wall 61 is for example interposed between the electric machine 18 and an exhaust cone 62 attached at the front or upstream of said exhaust cone 62 to the turbine rear frame 13.

The turbomachine 10 described above is particularly advantageous because it is able to adapt its axial position to avoid uncoupling of the turbine shaft 17 and of the electric machine rotor 24 in the event of axial movement of the turbine shaft 17, but also to adapt to an offset between the turbine shaft 17 and the electric machine rotor 24. Furthermore, it is advantageous because it provides a forced uncoupling of the turbine shaft 17 and of the electric machine rotor 24, particularly in the event of failure of the electric machine 18 or of the electric circuit to which it is connected.

The invention claimed is:

1. Aircraft turbomachine extending along a longitudinal axis of axial direction and comprising:
    a fixed stator,
    a turbine shaft extending along the longitudinal axis up to a rear end of the turbomachine and being capable of rotating about the longitudinal axis relative to the stator,
    an electric machine arranged at the rear of the turbine shaft and comprising an electric machine stator attached to the stator and an electric machine rotor coaxial with the electric machine stator about an electric machine axis of axial direction and capable of rotating relative to the electric machine stator about said electric machine axis,
    a coupling carriage mounted rotationally fixed with the electric machine rotor about the electric machine axis and capable of moving in translation relative to the electric machine rotor in the axial direction between a coupled position and an uncoupled position,
    coupling members, one carried by a rear end of the turbine shaft, the other carried by the coupling carriage, the coupling members being designed to engage with one another after the coupling carriage has moved from the uncoupled position to the coupled position and to transmit a torque from the turbine shaft to the electric machine rotor and/or vice versa, when the coupling members are engaged with one another,
    an elastic return member mounted between the coupling carriage and the electric machine rotor and designed to elastically return the coupling carriage in translation in the axial direction to the coupled position, and
    an actuator designed to drive the coupling carriage in translation from the coupled position to the uncoupled position, the actuator comprising a movable part and a fixed part relative to which the movable part is capable of moving in translation in the axial direction, and wherein the movable part of the actuator is designed to drive the coupling carriage in translation from the coupled position to the uncoupled position, when the movable part itself moves in translation from a first engaged position to a second engaged position, and the movable part of the actuator being designed to move in translation relative to the fixed part from a first disengaged position wherein the movable part and the coupling carriage are free to move relative to one another, to the first engaged position, when the coupling carriage occupies the coupled position.

2. Turbomachine according to claim 1, wherein the coupling members are dogs.

3. Turbomachine according to claim 1, wherein the rear end of the turbine shaft carries one of the coupling members by means of an annular support comprising, successively in the axial direction, a first part mounted rotationally fixed with the turbine shaft, a second part carrying said coupling member and a third flexible part connecting the first part to the second part and being capable of allowing a movement of the first part relative to the second part in the axial and radial directions.

4. Turbomachine according to claim 1, wherein the coupling carriage comprises a carriage part by means of which the coupling carriage is mounted rotationally fixed about the electric machine axis and free in translation in the axial direction with the electric machine rotor, a coupling part carrying the other of the coupling members and a connecting part connecting the carriage part to the coupling part and comprising a first portion that extends axially in the extension of the coupling part towards the carriage part and that forms a tapered flange.

5. Turbomachine according to claim 1, comprising a lubricated enclosure wherein are housed the bearings supporting the electric machine rotor and first splines arranged in correspondence in the coupling carriage and in the electric machine rotor to drive in rotation the coupling carriage by the electric machine rotor and/or vice versa and to guide in axial translation the coupling carriage relative to the electric machine rotor, and a lubrication circuit comprising an injector designed to inject oil into the lubricated enclosure.

6. Turbomachine according to claim 1, comprising locking members, one carried by the electric machine rotor, the other carried by the coupling carriage, the locking members being designed to engage with one another after the coupling carriage has moved in translation relative to the electric machine rotor from the coupled position to the uncoupled position and to lock the translational movement of the coupling carriage relative to the electric machine rotor from the uncoupled position to the coupled position, when the coupling carriage occupies the uncoupled position.

7. Turbomachine according to claim 6, wherein the movable part of the actuator is designed to move in translation relative to the fixed part from the second engaged position to a second disengaged position wherein the movable part and the coupling carriage are free to move relative to one another, when the coupling carriage is locked in uncoupled position by the locking members.

* * * * *